United States Patent [19]

Delalande et al.

[11] Patent Number: 5,036,433
[45] Date of Patent: Jul. 30, 1991

[54] CONNECTION STRIP FOR ANODES OF ELECTROLYTIC CAPACITORS AND METHOD FOR THE FABRICATION OF ELECTROLYTIC CAPACITORS USING SUCH A STRIP

[75] Inventors: Francois Delalande, Saint Pierre de Bresse; Georges Boulloy, Dijon, both of France

[73] Assignee: Compagnie Europeenne de Composants Electroniques LCC, Courbevoie, France

[21] Appl. No.: 503,965

[22] Filed: Apr. 4, 1990

[30] Foreign Application Priority Data

Apr. 21, 1989 [FR] France .................. 89 05318

[51] Int. Cl.$^5$ ............................................. H01G 9/06
[52] U.S. Cl. ........................... 361/529; 29/25.03
[58] Field of Search ............... 29/25.03; 361/528, 529, 361/538, 539, 540

[56] References Cited

U.S. PATENT DOCUMENTS

| 3,566,203 | 2/1971 | Maguire et al. | 361/540 |
| 3,588,628 | 6/1971 | Peck | 361/540 |
| 4,688,322 | 8/1987 | Fossey | 29/25.03 |

FOREIGN PATENT DOCUMENTS

| 1264816 | 5/1961 | France . |
| 2303395 | 3/1976 | France . |
| 2121604 | 12/1983 | United Kingdom . |

*Primary Examiner*—Donald Griffin
*Attorney, Agent, or Firm*—Pollock, VandeSande & Priddy

[57] ABSTRACT

A transfer and connection strip for anodes of electrolytic capacitrs for in situ fabrication of electrolytic capacitors includes a main part and tabs for each anode to be connected thereto. Each tab includes a first portion made of the same metal as the anodes and a second portion made of material of good soldering quality.

9 Claims, 2 Drawing Sheets

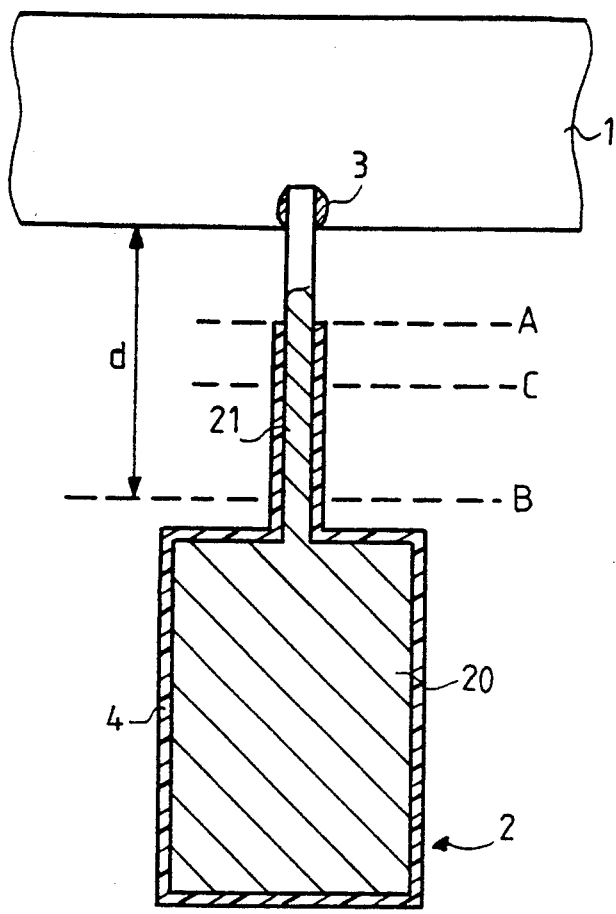
FIG_1
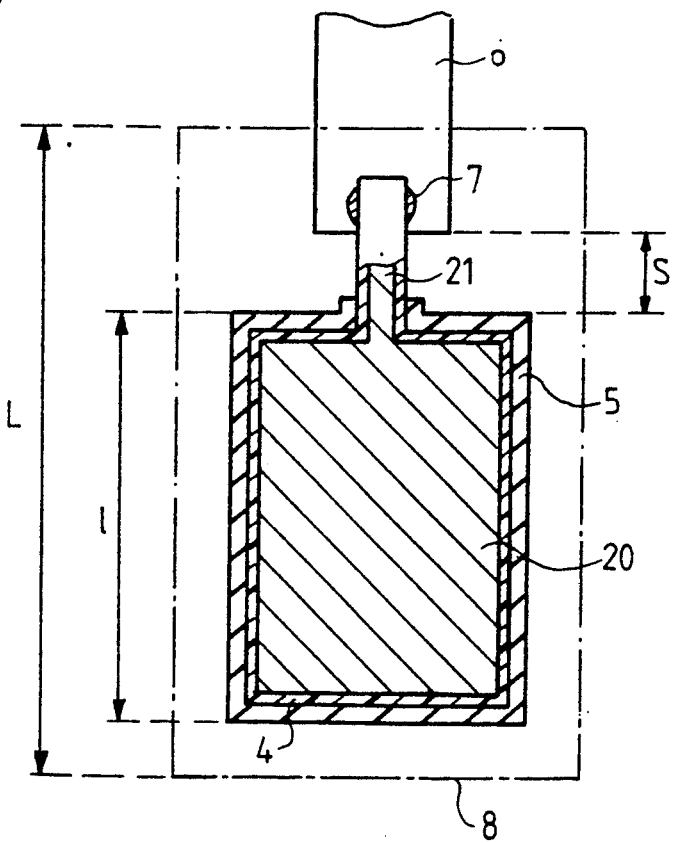
FIG_2

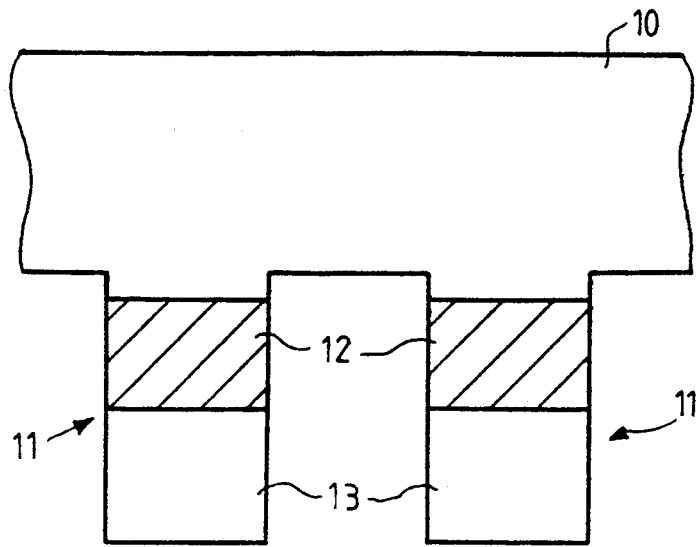
FIG_3
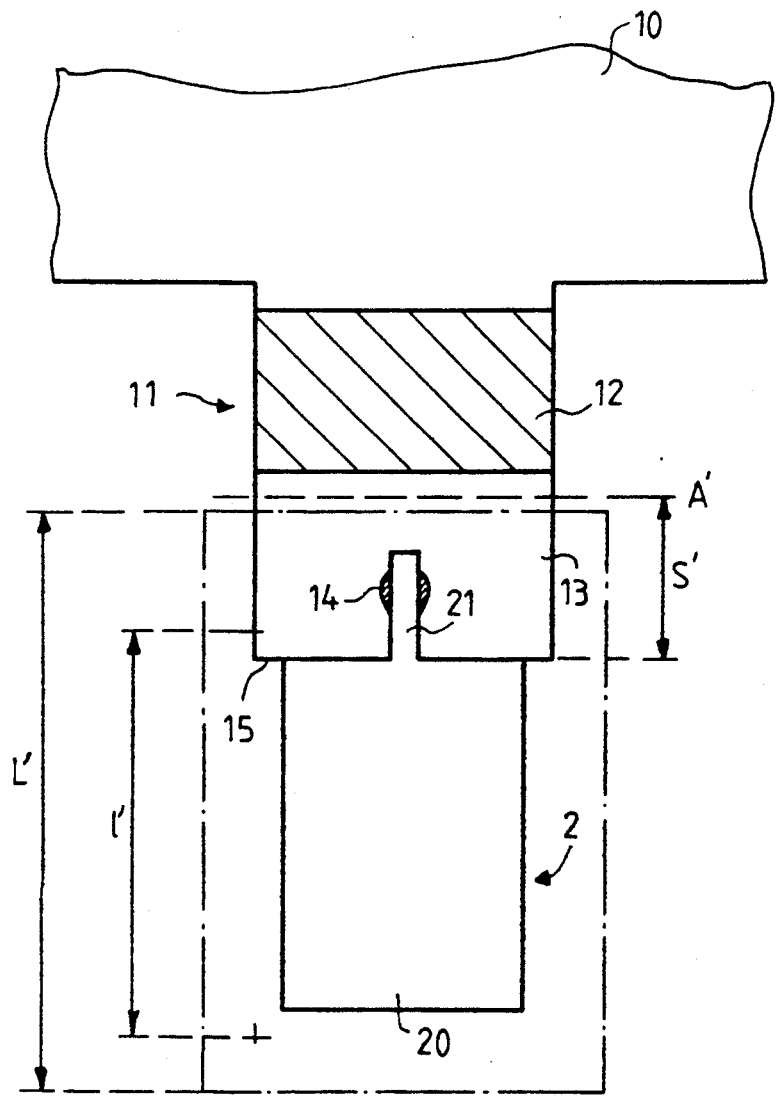
FIG_4

CONNECTION STRIP FOR ANODES OF ELECTROLYTIC CAPACITORS AND METHOD FOR THE FABRICATION OF ELECTROLYTIC CAPACITORS USING SUCH A STRIP

BACKGROUND OF THE INVENTION

1. Field of the Invention

The present invention concerns the fabrication of electrolytic capacitors and, in particular, the fabrication of capacitors in the form of surface-mounted chips.

2. Description of the Prior Art

There are several types of problems currently encountered in the fabrication of electrolytic capacitors.

A great apparent surface has to be developed on the anode to have a high capacitance in relation to volume.

The operation of impregnation by an electrolyte should be compatible with the technology used, the supply voltage desired and the climatic category envisaged for the components.

For SMC (surface-mounted component) type capacitors in particular, it is sought to obtain the highest possible capacitance in relation to volume and, hence, to reduce the inactive parts of the finished product. Since the impregnation is done on the oxidized part of the anode but should not go over on to the non-oxidized part which is electrically connected to the anode connection, it is sought to reduce the length of the oxidized part of the anode which is not impregnated and therefore capacitatively inactive. However, reduction of the inactive part is limited because of the short-circuits which may occur in this area. The existing tolerances with respect to oxidation and impregnation levels require a certain safety margin to be retained. This is a very essential point and is difficult to resolve except to the detriment of the total volume of the capacitor. For either aluminum or for tantalum capacitors, the minimum inactive volume enabling proper insulation to be provided between the electrolyte and the non-oxidized part of the anode is, according to prior art, a quantity between a quarter and a half of the total volume of the finished product, depending on the format. Retaining of such large safety margin restricts the miniaturization of the components or, similarly, reduces the range of capacitance that can be set up in a given volume.

In the prior art manufacturing methods, the complete anode of the capacitors is treated by insulating oxidation to produce an element that is ready to be impregnated and clad use. For this purpose, this element is transferred to final connections (wire or lead-frame) of use, on the anode or cathode side, to enable soldering or its transfer to a printed circuit.

In order to overcome the problems of electrical insulation while increasing the capacitance in relation to volume of the electrolytic capacitors, it is an object of the present invention to provide a connection strip for SMC type electrolytic capacitor anodes as well as a fabrication method that enables the elimination of a standard operation of transferring a terminal anode connection to the product and, at the same time, the elimination of the deterioration in the insulation, or possible short-circuiting.

SUMMARY OF THE INVENTION

An object of the invention, therefore, is a connection strip for manufacturing anodes of SMC type electrolytic capacitors comprising tabs for connecting the anodes thereto, each tab being provided with a first zone made of the same metal as the anodes and designed to be connected to the anode, and a second zone of good soldering quality.

Another object of the invention is a method for the fabrication of electrical capacitors using anodes made of an anodizable metal, which comprises the following steps:

soldering of the anodes to a connection strip at zones of the strip formed by a metal identical to that of the anodes;

formation (oxidation) of the anodes;

impregnation of the oxidized anodes;

positioning of the cathodes;

carrying out of the capacitor finishing operations including the making of anode electrodes out of zones of the strip formed by a metal of good soldering quality.

BRIEF DESCRIPTION OF THE DRAWINGS

The invention will be understood more clearly and other advantages will appear from the following description, given as a non-restrictive example, accompanied by the appended drawings, of which:

FIG. 1 shows an anode for an electrolytic capacitor under treatment according to a prior art fabrication method;

FIG. 2 shows a prior art operation for transferring the semi-finished component to its final connection;

FIG. 3 shows a transfer and connection strip according to the invention;

FIG. 4 illustrates the use of a transfer strip according to the invention for the fabrication of electrolytic capacitors.

DESCRIPTION OF A PREFERRED EMBODIMENT

The present invention can be applied to aluminum capacitors as well as to those made out of other metals, such as tantalum or niobium, and the like, that can be used to obtain electrolytic capacitors. These metals, which are capable of developing a relatively thick layer of insulator oxide by oxidation, shall be called anodizable metals in the rest of the description.

FIG. 1 shows an anode for electrolytic capacitors under treatment according to a prior art fabrication method. This figure shows a metal strip 1 that cannot be oxidized. It is usually a strip of stainless steel. Anodes for electrolytic capacitors are soldered to this transfer strip. Only one anode 2 has been shown in FIG. 1. It is formed by a block or mass 20 and a connecting arm 21. The anode is attached, by its connecting arm 21, to the transfer strip 1 by means of a solder 3. Thus, by means of the transfer strip, the anodes will be treated collectively in undergoing the oxidation and impregnation operations. In FIG. 1, the anode has already undergone the oxidation operation and an oxide layer 4 has formed on the block 20 and on a part of the arm 21. Thus an oxidation level A is had.

After the oxidation the anode is impregnated. As stated above, the electrolyte should not come into contact with the metal of the anode. This sets a limit level B that takes the tolerances to be observed into account and is designed to prevent short-circuits during the electrochemical fabrication operations. The distance d between the upper limit of the electrolyte and the bottom of the strip 1 is typically 10 mm.

Between the levels A and B, the arm 21 is cut to enable the transfer of the obtained component. This sets the cutting out level C.

FIG. 2 shows the prior art operation for transferring the semi-finished component to its final connection. This figures shows the anode 2 made out of the block 20 and the arm 21 covered with the oxide layer 4. The impregnation operation provides the layer electrolyte 5. The arm 21, cut earlier to the level corresponding to C, is soldered to the connection 6. The solder 7 has been made after local destruction of the oxide layer. The line 8, drawn in dots and dashes, shows the dimensions of the final component obtained after coating. The connection is generally made of tinned copper/nickel for aluminum anodes and of tinned alloy with a high nickel content for tantalum anodes.

For a prior art capacitor such as this, the active length is 1 in reference to the total length L of the component. The distance S represents the insulation safety zone which should be selected such as to prevent short-circuits between the solder 7 and the electrolyte 5.

As all the operations are done automatically and as the capacitors are treated collectively, it will be understood that the succession of levels to be complied with means that the distance S amounts to a relatively major part of the inactive volume.

FIG. 3 shows a transfer strip according to the invention. The transfer strip 10, which can also be called a connection strip, is provided at regular intervals with lateral tabs 11. Each tab 11 has two zones of different natures: a zone 13, made of the same anodizable metal as that of the anodes to be treated, and a zone 12 made of a metal or alloy of good soldering quality. The term "good soldering quality" implies the possibility of connecting the metal of the zones 12 definitively to connections or electrodes of other components or, again, to printed circuit tracks, in doing so in a standard and common way (reflow soldering, by soldering iron or by the soldering machine commonly used in electronics).

The transfer or connection strip 10 may be made in different ways. Starting with an anodizable metal strip, made of the same metal as the anodes to be treated, it is possible to make the tabs 11, for example by, embossing. A metal of good soldering quality can then be deposited on the zones 12. This metal could, if necessary, be deposited on the strip 10 before conducting the operation for cutting out the tabs. The tabs could also be designed to be on each side of the connection strip.

As a non-restrictive example, if the strip 10 is made of aluminum, the zones 12 of the tabs could be copper-plated in an electrolytic bath after removing the aluminum oxide layer on these zones by brushing or by the action of a chemical. The advantage of this method is that it can be implemented continuously. The copper-plated zones can then be tinned or silvered to further improve the soldering quality.

It is also possible to start with a strip made of a non-anodizable metal, such as steel, to cover the zones 13 with an anodizable metal for example, aluminum, and to cover the zones 12 with a metal, or a succession of metal layers of good soldering quality.

Another method could consist of taking a metal strip of good soldering quality and covering the zones 13 with a deposit of anodizable metal.

FIG. 4 illustrates the use of a transfer strip according to the invention for the fabrication of electrolytic capacitors. The arm 21 of the anode 2 has been fixed to the zone 13 of the tab 11 by a solder 14. Since the zone 13 and the anode 2 are made of the same anodizable metal, the oxidation that will take place during the following operation will create the insulation necessary for impregnation. There will then be every reason, for purposes of miniaturization, to place the anode 2 against the edge 15 of the tab 11. The level A' representing the limit of oxidation and the distance S' representing the insulation safety zone may be greater than in the prior art fabrication method.

The transfer operation, after oxidation and impregnation of the anodes, is therefore eliminated and, by the same token, so are the risks of short-circuits or deterioration of the oxide forming the dielectric.

For a capacitor prepared according to the invention, the active length will be l' with reference to the total length L' of the component, after the oxidation and impregnation operations (the results of which cannot be seen in FIG. 4). The ratio of the lengths l'/L' is greater, in the case of FIG. 4, than the ratio l/L of the lengths indicated in FIG. 2. The result thereof is greater capacitance in relation to volume for the capacitor made by the method according to the invention.

Another advantage of the invention lies in the fact that the anode can be put into contact with the edge of the tab, thus making it possible to provide for accurate positioning of the anode with respect to the transfer strip. Moreover, in order to further improve this positioning, the tip of the tab can be cut out and/or folded at 90°. This variant is of definite value when the anode is made up of a simple block without any connecting arm. The anode block can then be soldered to the tab by means of lugs at the end of the tab, folded by 90° with respect to the rest of the tab.

The transfer and connection strip according to the invention has the advantage of being capable of integration into the anode block. In this case, the anodes may be made by sintering or Schoop's metal spraying, directly on the zones 13 of anodizable material.

After impregnation, the cathodes, extended by their connections, will be positioned according to prior art techniques. The capacitive elements obtained will be coated for, example. The tabs 11 will then be detached from the rest of the strip 10 by being cut out and, if it is desired, to obtain capacitor chips, the zones 12 will be folded down on the coating to act as anode connections. In the same way, the cathode connections will be folded down on the coating of the component.

What is claimed is:

1. A transfer and connection strip for anodes of SMC type electrolytic capacitors and in situ fabrication of such capacitors, said strip including a main part and a plurality of substantially lateral tabs spaced apart along the length of said main part at least at one side thereof, each tab including a first portion located adjacent the free end thereof, said first portion being made of an anodizable metal and adapted to be connected to said anode and a second portion located on said tab substantially adjacent said main part and being made of a material having good soldering quality.

2. A transfer and connection strip according to claim 1, wherein said first and second portions are made of materials different from the main part of the connection strip.

3. A transfer and connection strip according to claim 1, wherein said second portion is of the same material as the main part of the connection strip.

4. A transfer and connection strip according to claim 1, wherein said first potion is of the same material as the main part of the connection strip.

5. A transfer and connection strip according to claim 1, wherein the connection strip is made of aluminum, said second portion being formed by a deposit of copper covered with a deposit of tin.

6. A transfer and connection strip according to claim 1, wherein the edge of each tab is provided with at least one folded lug designed to come into contact with the anode.

7. A transfer and connection strip according to claim 1, wherein said tabs are provided at both sides of said main part.

8. A method for the fabrication of electrical capacitors using anodes made of an anodizable metal, said method comprising the following steps:

forming a transfer and connection strip including a plurality of tabs spaced apart along the length of the strip, each tab having a first portion and a second portion, said first portion being made of an anodizable metal and said second portion being made of a material having good soldering quality;

soldering of the anodes to said tabs of the connection strip at said first portion;

forming of the anodes by oxidation;

impregnating of the oxidized anodes;

positioning of the cathodes;

carrying out of the capacitor finishing operations and disconnecting said capacitors by separating said tabs from said main portion of said strip.

9. A method according to claim 8, wherein said anode is adapted to be positioned in edge to edge contact with said first portion of said strip.

* * * * *